United States Patent [19]

Hua et al.

[11] Patent Number: 5,418,704
[45] Date of Patent: May 23, 1995

[54] ZERO-VOLTAGE-TRANSITION PULSE-WIDTH-MODULATED CONVERTERS

[75] Inventors: Guichao C. Hua; Fred C. Lee, both of Blacksburg, Va.

[73] Assignee: Center for Innovative Technology, Herndon, Va.

[21] Appl. No.: 66,943

[22] Filed: May 24, 1993

Related U.S. Application Data

[63] Continuation-in-part of Ser. No. 897,674, Jun. 12, 1992, Pat. No. 5,262,930.

[51] Int. Cl.⁶ .............................................. H02M 3/335
[52] U.S. Cl. ....................................... 363/21; 323/222; 323/282
[58] Field of Search ............................. 363/16, 20, 21; 323/222, 224, 282, 351

[56] References Cited

U.S. PATENT DOCUMENTS

| | | | |
|---|---|---|---|
| 4,785,387 | 11/1988 | Lee et al. | 363/21 |
| 4,811,188 | 3/1989 | Bees | 363/28 |
| 5,066,900 | 11/1991 | Bassett | 323/224 |
| 5,172,309 | 12/1992 | DeDoncker et al. | 363/132 |
| 5,262,930 | 11/1993 | Hua et al. | 363/21 |

Primary Examiner—Thomas M. Dougherty
Assistant Examiner—Adolf Berhane
Attorney, Agent, or Firm—Whitham, Curtis, Whitham & McGinn

[57] ABSTRACT

To date, soft-switching techniques applied to the PWM converters, with the exception of a few isolated cases, are subjected to either high switch voltage stresses or high switch current stresses, or both. This invention presents a new class of zero-voltage-transition PWM converters, where both the transistor and the rectifier operate with zero-voltage switching, and are subjected to minimum voltage and current stresses. Breadboarded converters are constructed to verify the novelty of the proposed new family of converters.

2 Claims, 9 Drawing Sheets

ZERO-VOLTAGE-TRANSITION PULSE-WIDTH-MODULATED CONVERTERS

This application is a continuation-in-part of application Ser. No. 07/897,674, filed Jun. 12, 1992, now U.S. Pat. No. 5,262,930 which is incorporated herein by reference.

BACKGROUND OF THE INVENTION

1. Field of the Invention

The present invention relates to pulse-width-modulated (PWM) converters, and more particularly, to a novel class of zero-voltage-transition PWM converters, in which both the converter switching transistor and rectifier diode operate with zero-voltage-switching and minimum voltage and current stress.

2. Description of the Prior Art

Conventional prior art pulse-width-modulated converters experience substantial switching losses when operated at high frequencies. These switching losses limit the frequency at which the converter can be operated, which in turn limits the ability to reduce the size and weight of the converter reactive components and hence the size and weight of the converter.

In recent years, a number of soft-switching technologies have been proposed. However, switching losses in these circuits embodying these new technologies can be reduced only at the expense of greatly increased voltage/current stresses of the switches, and this leads to a substantial increase in conduction loss.

For one example, the active switch in a zero-voltage-switched (ZVS) quasi-resonant converter (QRC) is subjected to relatively low current stress. However, in single-ended ZVS-QRC topologies, the active switch suffers from an excessive voltage stress which is proportional to the load range. And, although the active switch operates with ZVS, the rectifier diode operates with ZCS. The parasitic junction capacitance of the rectifier diode interacts with the large resonant inductor, resulting in severe switching oscillation noise.

For another example, the ZVS multi-resonant convert (MRC) technique utilizes all major parasitics of the power stage and all semiconductor devices in a ZVS-MRC operate with zero-voltage switching, which substantially reduces the switching losses and switching noise. All semiconductor devices in a ZVS-MRC operate with zero-voltage switching, which substantially reduces the switching losses and switching noise. Nevertheless, both active and passive switches in a ZVS-MRC are subjected to voltage and current stresses significantly higher than those in their PWM counterparts. Although the switching losses are eliminated, the conduction loss increases significantly. In addition, the advantage of the smaller size of the reactors (the power transformer and filters) due to high-frequency operation is also partially mitigated by the need for a relatively large resonant inductor, whose size is usually comparable to that of the power transformer. This resonant inductor also introduces additional core loss and copper loss.

The ZVS quasi-square-wave converter (QSC) technique offers zero-voltage switching for both the active and passive switches without increasing their voltage stresses. This is a very desirable feature for high-frequency conversion where MOSFETs are used, since power MOSFETs favor the zero-voltage switching operating mode, and their conduction characteristics are strongly dependent on voltage rating. However, the switches in a ZVS-QSC suffer from a high current stress which can be more than twice of that in its PWM counterpart; thus, the conduction losses are greatly increased. In addition, the high turn-off current of the main switch tends to increase the turn-off loss. This limitation requires special attention when minority-carrier power devices, such as IGBTs and BJTs, are used as the power switches.

This invention presents a new class of zero-voltage-transition (ZVT) PWM converters. By using a resonant network in parallel with the switches, the proposed converters achieve zero-voltage-switching for both the active and passive switches without increasing their voltage and current stresses. In the following section, the boost ZVT-PWM converter is used as an example to illustrate the operation of the new converters.

SUMMARY OF THE INVENTION

An object of this invention is the provision of a pulse-width-modulated converter that has zero-voltage-switching for both the active and passive converter switches without increased voltage or current stress.

Briefly, this invention relates to a zero-voltage-transition converter that has a resonant network in parallel with both the active pulse modulating switch and the passive converter diode switches. The resonant network includes an inductance/capacitance tank circuit controlled by an auxiliary switch, and an auxiliary diode switch in circuit with the auxiliary switch.

One exemplary embodiment of the invention is the basic boost pulse-width-modulator. In accordance with the teachings of this invention, a resonant circuit is connected in parallel with the pulse-width-modulating switch. An auxiliary switch, also in parallel with the pulse-width-modulating switch, is turned on (i.e., rendered conducting) for a short interval just prior to turning on the pulse-width-modulating switch. The resonant circuit inductor current ramps up until it turns off the output rectifier diode, commutating it with a soft-switching operation. The inductor current continues to increase, owing to the resonance of the inductance/capacitance tank circuit, bringing the voltage across the pulse-width-modulating circuit to zero at a time prior to turn-on of this switch. The anti-parallel diode of the pulse-width-modulating switch is thus turned on; the turn-on signal for this switch is applied while the anti-parallel diode is conducting, providing zero-voltage-switching of the modulating switch at turn on. The auxiliary switch is turned off and the modulating switch is turned on. An auxiliary diode clamps the voltage across the auxiliary switch, so that the auxiliary switch is not stressed at turn off. The energy stored in the resonant circuit is transferred to the load, and the resonant inductor current rapidly drops to zero, at which time the auxiliary diode turns off. For a boost converter the remainder of the operation is the same as that of a conventional pulse-width-modulated boost converter. As will be explained in more detail, the auxiliary-switch-controlled resonant circuit of this invention can be employed advantageously with a wide converter and inverter pulse-width-modulated topographies in order to provide soft-switching commutation of both the power modulating switch and the rectifier diode.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
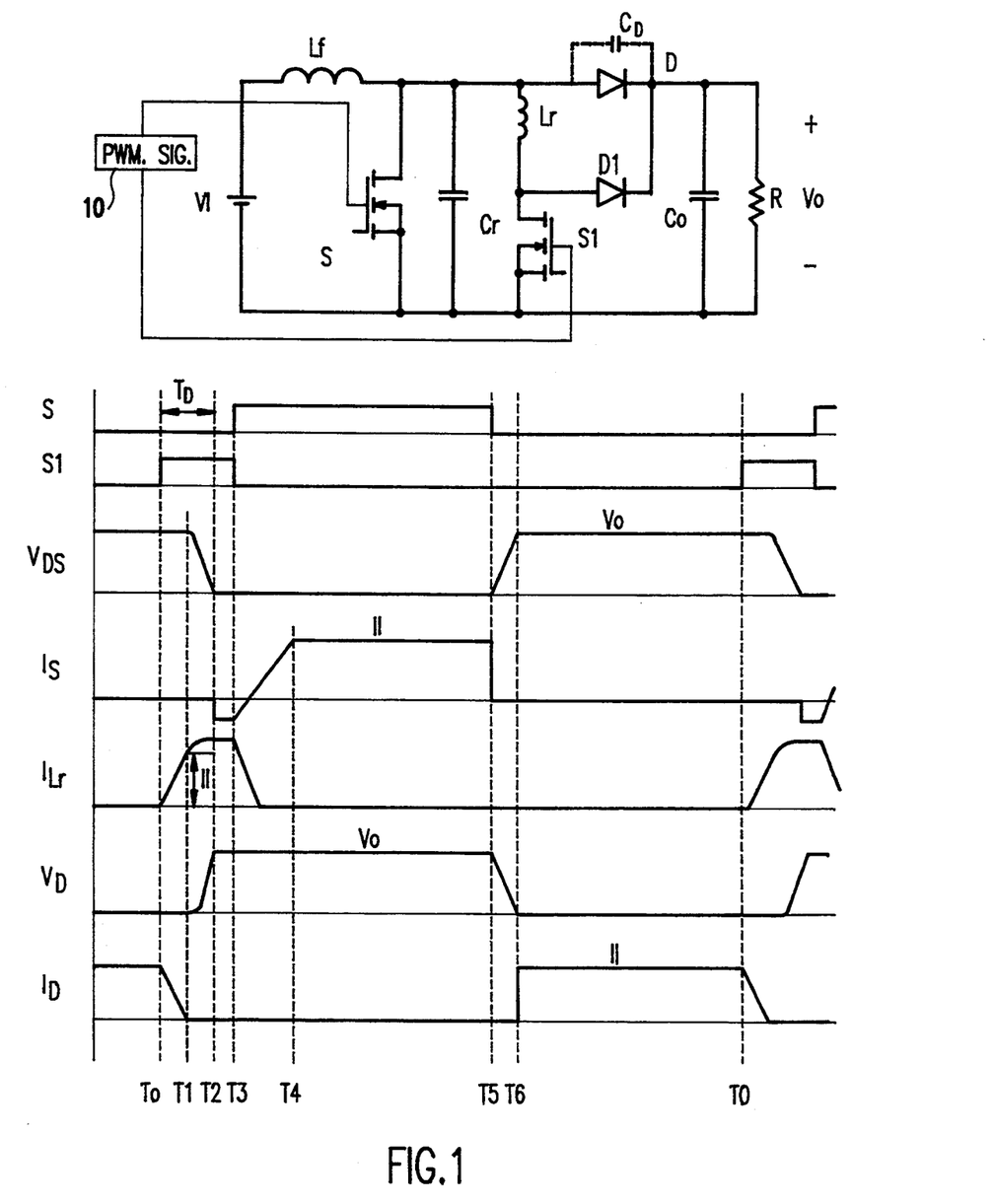
FIG. 1 is a circuit diagram and its waveforms of a boost ZVT-PWM converter in accordance with the invention.
Figure 2A:
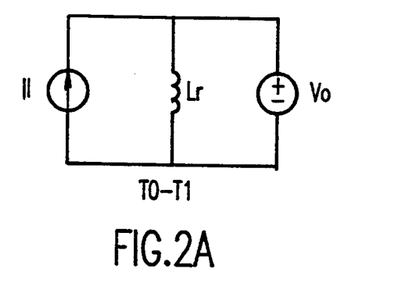
FIGS. 2a–g shows the equivalent circuits for different operation stages of the ZVT-PWM boost converter of FIG. 1.

Referring now to the drawings, FIG. 1 shows the circuit diagram and the key waveforms of a boost ZVT-PWM converter in accordance with the invention. As in a conventional boost converter, it includes a voltage source V1, and a pulse-width-modulating switch S connected across the voltage source V1. A pulse-width-modulating signal source 10 is connected to the semiconductor switch S. A rectifier (diode D) and a filter comprised of inductor Lf and capacitor Co connects pulse-width-modulated switch output to a load R. The converter of this differs from a conventional boost PWM converter by possessing an additional resonant network consisting of a resonant inductor ($L_r$), an auxiliary switch (S1), and a diode (D1). $C_r$ is the resonant capacitor, which includes the output capacitance of the power switch, and $C_D$ is the junction capacitance of the rectifier. By applying the capacitor-shift rule, $C_r$ can be placed across $C_r$ so that it becomes part of $C_r$. To simplify the analysis, the input filter inductance is assumed large enough to be considered as a current source, $I_i$. As shown in FIG. 2, eight operation stages exist within one switching cycle:

(a) $T_0$–$T_1$: Prior to $T_0$, the main switch (S) and the auxiliary switch (S1) are off, and the rectifier diode (D) is conducting. At $T_0$, S1 is turned on. The $L_r$ current linearly ramps up until it reaches $I_i$ at $T_{1s}$ where D is turned off with soft-switching. This time interval, $t_{01}$, is given by:

$$t_{01} = \frac{I_i}{V_o/L_r} \quad (1)$$

Figure 2B:
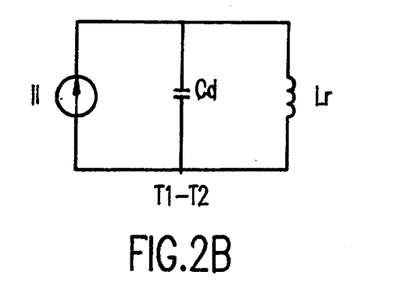

(b) $T_1$–$T_2$: $L_r$ current continues to increase due to the resonance between $L_r$ and $C_r$. $C_r$ is discharged until the resonance brings its voltage to zero at $T_2$, where the anti-parallel diode of S starts to conduct. This resonant time period, $\tau_{12}$, is:

$$t_{12} = \frac{\pi}{2} \sqrt{L_r C_s} \quad (2)$$

Figure 2C:
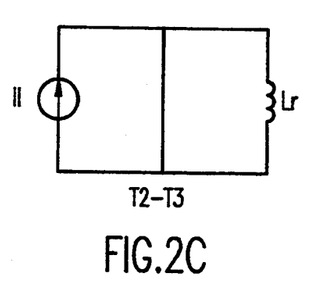

(c) $T_2$–$T_3$: The anti-parallel diode of S is on. To achieve ZVS, the turn-on signal of S should be applied while its body diode is conducting. Besides, the time delay between S1 and S gate signals, $\tau_{S1}$, has to satisfy the following inequality:

$$T_D \geq t_{01} + t_{12} = \frac{I_i}{V_o/L_r} + \frac{\pi}{2} \sqrt{L_r C_s} \quad (3)$$

Figure 2D:
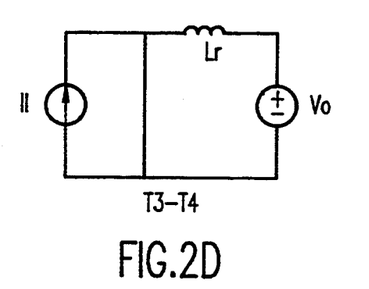

(d) $T_3$–$T_4$: At $T_3$, S1 is turned off, and its voltage is clamped at $V_o$ due to the conduction of D1. During this time period, S is turned on. The energy stored in the resonant inductor is transferred to the load during this time interval. $L_r$ current decreases linearly until it reaches zero at $T_4$.

Figure 2E:
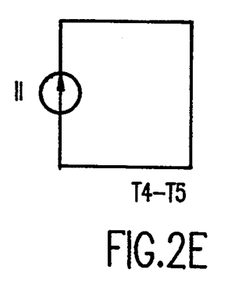

(e) $T_4$–$T_5$: D1 is turned off at $T_4$. The operation of the circuit at this stage is identical to that of the PWM boost converter.

Figure 2F:
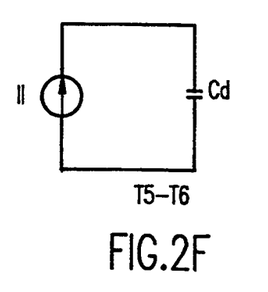

(f) $T_5$–$T_6$: At $T_5$, S is turned off. $C_r$ is linearly charged by $I_1$ to $V_1$ voltage.

Figure 2G:
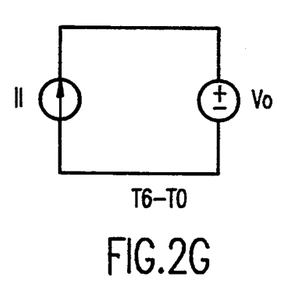
Figure 3A:
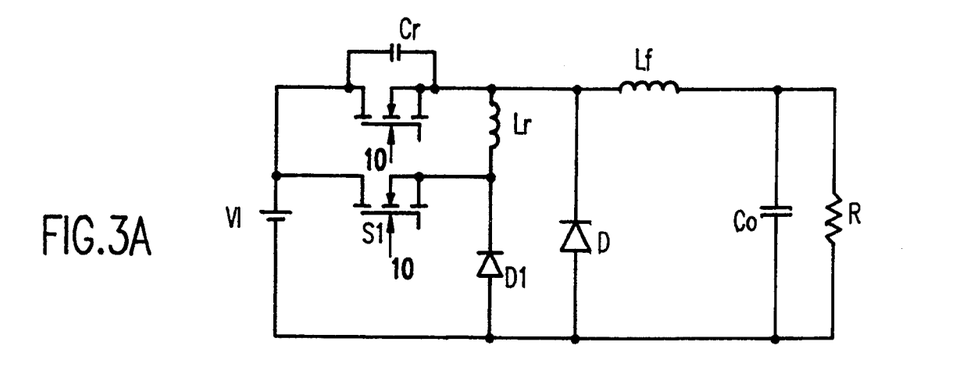
FIGS. 3a–f shows six basic topologies (buck, boost, buck-boost, Cuk, SEPIC and Zeta) of the ZVT-PWM converter in accordance with the invention.
Figure 3B:
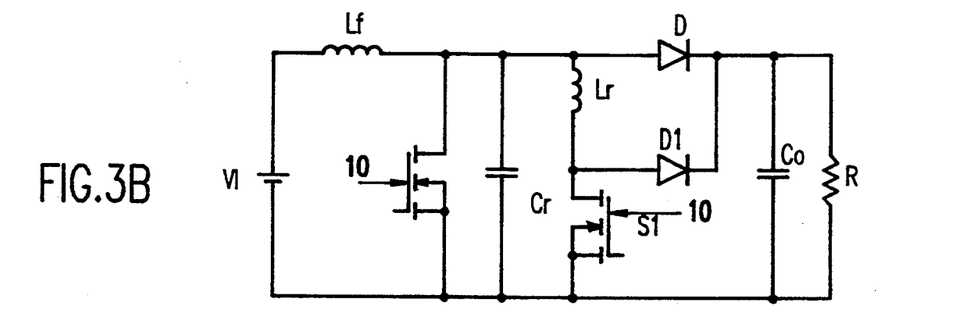
Figure 3C:
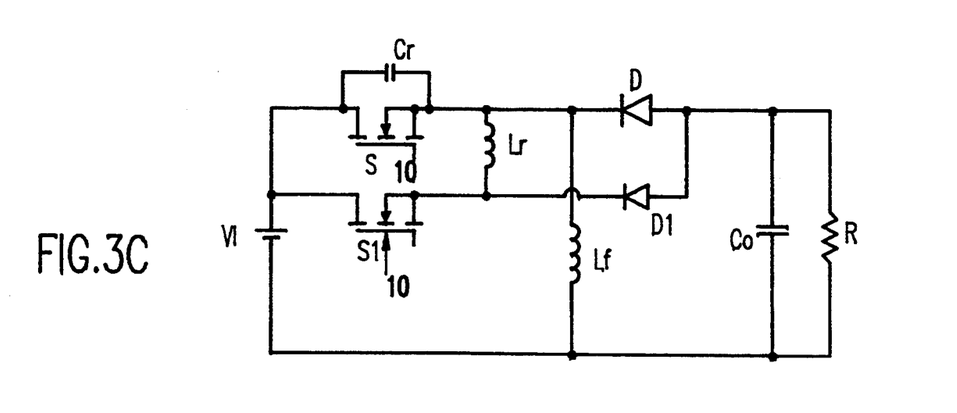
Figure 3D:
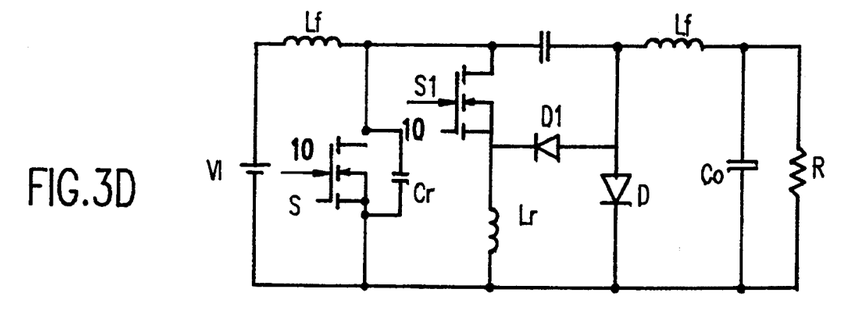
Figure 3E:
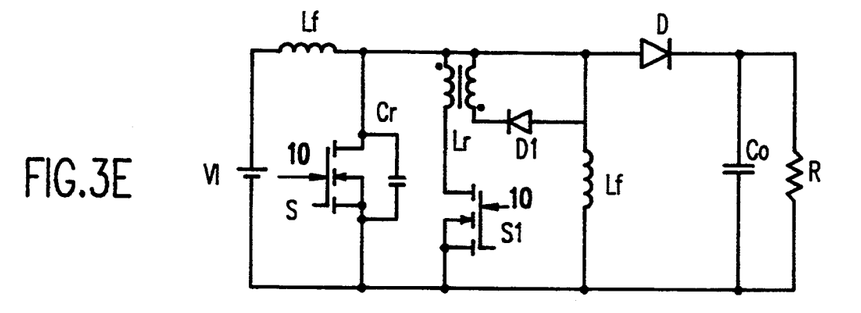
Figure 3F:
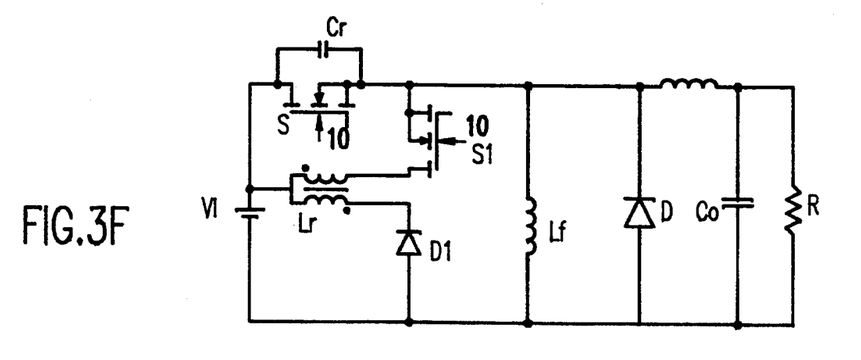
Figure 4A:
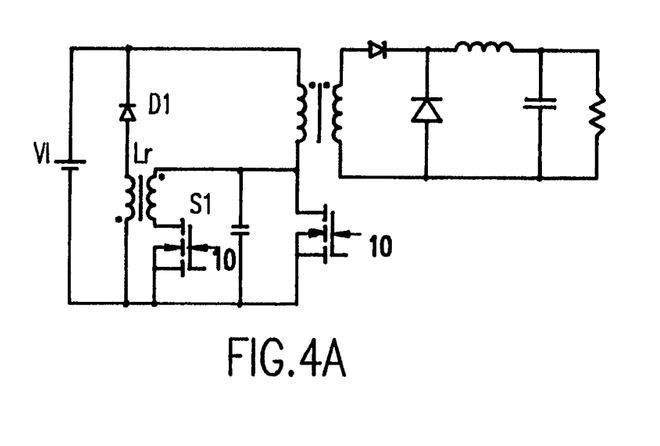
FIGS. 4a–d shows four isolated topologies (forward, flyback, Cuk and SEPIC).
Figure 4B:
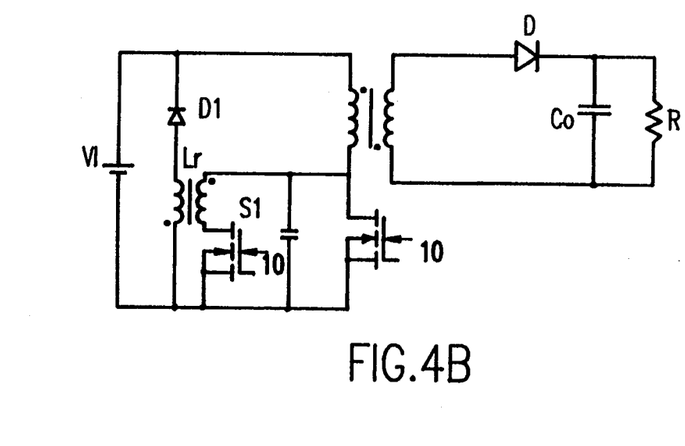
Figure 4C:
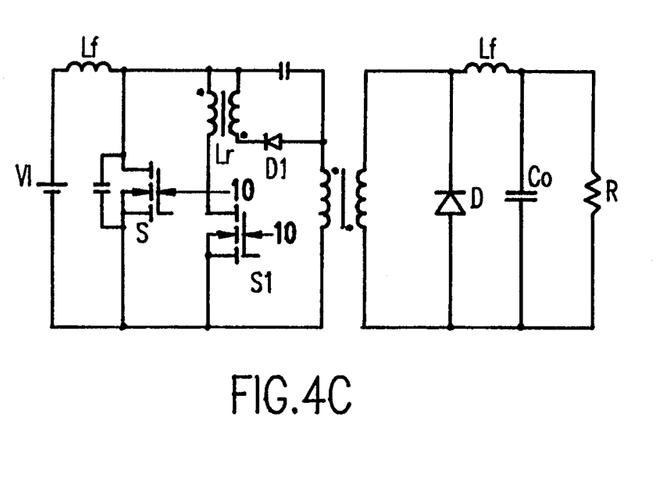
Figure 4D:
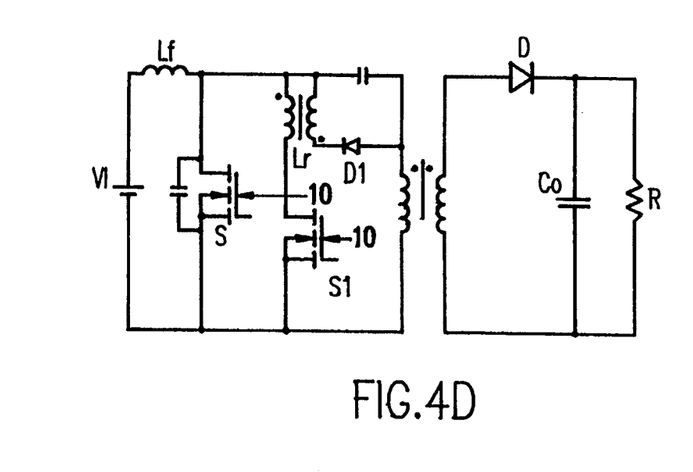

(g) $T_o$–$T_o$: This interval is identical to the freewheeling stage of the boost PWM converter. At $T_o$, S1 is turned on again, starting another switching cycle.

Based on the above description, the features of the ZVT-PWM boost converter can be summarized as follows:

A. Soft-switching for both the transistor and rectifier diode

It can be seen that in addition to the power switch, the rectifier diode in the new converter is also commutated under soft-switching. This feature makes the ZVT-PWM technique particularly attractive for high-voltage conversion applications, where the rectifier diodes suffer from severe reverse recovery problems. For instance, in a power-factor correction (PFC) boost circuit, both the power switch and the rectifier diode are subjected to high voltage. With the conventional PWM, or the ZVS-QRC, or the ZVS-PWM technique employed, due to the reverse recovery of minority-carrier rectifier diode, the high switching loss, high EMI noise, and device failure problems become more pronounced. Therefore, implementing soft-switching for both the transistor and the rectifier diode in such a circuit is particularly rewarding.

B. Minimum switch voltage and current stresses

From FIG. 1, it can be seen that the voltage and current waveforms of the switches in the new converter are essentially square-wave except during the turn-on and turn-off switching intervals, when the zero-voltage-switching transition takes place. Both the power switch and the rectifier diode are subjected to minimum voltage and current stresses. In addition, the ZVT time intervals $T_o$–$T_3$ and $T_5$–$T_6$ can be very short with respect to the switching cycle, so the operation of the new converter resembles that of the boost PWM converter during most portions of the cycle. Circulating energy employed to realize ZVS is therefore minimum. The auxiliary switch can be very small compared to the main switch, as it only handles small amounts of resonant-transition energy. Since soft-switching is achieved without increasing switch voltage and current stresses, the penalty of increase in conduction loss is minimal.

C. Soft-switching maintained for wide line and load range

One drawback of ZVS-QRC and ZVS-PWM techniques is that the soft-switching condition is strongly dependent on load current and input voltage. At light load, zero-voltage switching is usually difficult to maintain, since the energy stored in the resonant inductor at light load is not sufficient to completely discharge the resonant capacitor prior to turn-on of the active switch. At high line, zero-voltage-switching is easier to lose, since it needs more energy to discharge the resonant capacitor.

The situation is opposite in a ZVT-PWM converter. In the ZVT-PWM boost converter, $I_1$ decreases when the load current is reduced, or when the line voltage increases. From inequality, it can be seen that when $I_1$ decreases, $\Delta T_{01}$ also decreases, and $\Delta T_{12}$ remains constant. Therefore, as long as inequality is satisfied at full load and low line, soft-switching operation will be ensured for the whole load and line range.

This unique feature is very important for many applications. Owing to the advance of power device and soft-switching converter technologies, high power capability, low conduction loss, and low cost IGBT devices are frequently used in today's switched-mode power processing circuits. In order to reduce the turn-off loss of the IGBT device, a considerably large external capacitor across IGBT is often used to soften the switching process. Quite often, this external capacitor can cause excessive device current stress and intolerable capacitive turn-on loss if ZVS is lost, or partially lost at light load and high line. In addition, even though losing ZVS at light load does not cause a thermal problem, EMI due to switching noises may be intolerable in a practical circuit.

D. Constant-frequency operation

Due to constant-frequency, the design optimization of the new circuit is easily attainable. In addition, since the operation of the proposed converter resembles that of its PWM counterpart except during short ZVT time, current-mode control can be directly applied to the new converter.

A NEW FAMILY OF ZVT-PWM CONVERTERS

The concept of ZVT as illustrated in the boost ZVT-PWM converter can be extended to any switched-mode conversion/inversion topology. FIG. 3 shows six basic ZVT-PWM topologies. In the ZVT-PWM Sepic converter, a coupled-inductor serving as the resonant inductor is used to transfer the resonant-transition energy to the energy-storage capacitor. The resonant-transition energy can also be delivered to the load by placing the auxiliary diode (D1) and the secondary of the coupled-inductor across the output filter capacitor. In the ZVT-PWM Zeta converter, the coupled-inductor is used to transfer the resonant-transition energy back to input source. Although it can also be delivered to the load by placing D1 and L1 secondary across the output filter capacitor, it is sometimes not desirable since D1 will introduce some pulsating current at output. The principle of operation of the new converters is similar to that of the ZVT-PWM boost converter.

FIG. 4 shows several isolated topologies of the ZVT-PWM converters. As in the ZVS-QSC technique, the limitation of the isolated ZVT-PWM converters is that they do not utilize the leakage of the power transformer. Therefore, the transformer should be designed with a minimum leakage. The leakage inductance of a transformer, as well as its ac winding resistance (which determines the copper loss), can be minimized by using the interleaving technique, at the penalty of much increased winding capacitances. When the conventional PWM technique is used, the energy stored in these winding capacitances will be dissipated in the switches, thus significantly increasing the capacitive turn-on loss. Using the ZVT-PWM converter technique, these winding capacitances become part of $C_r$, thus they do not cause additional switching loss.

Figure 5:
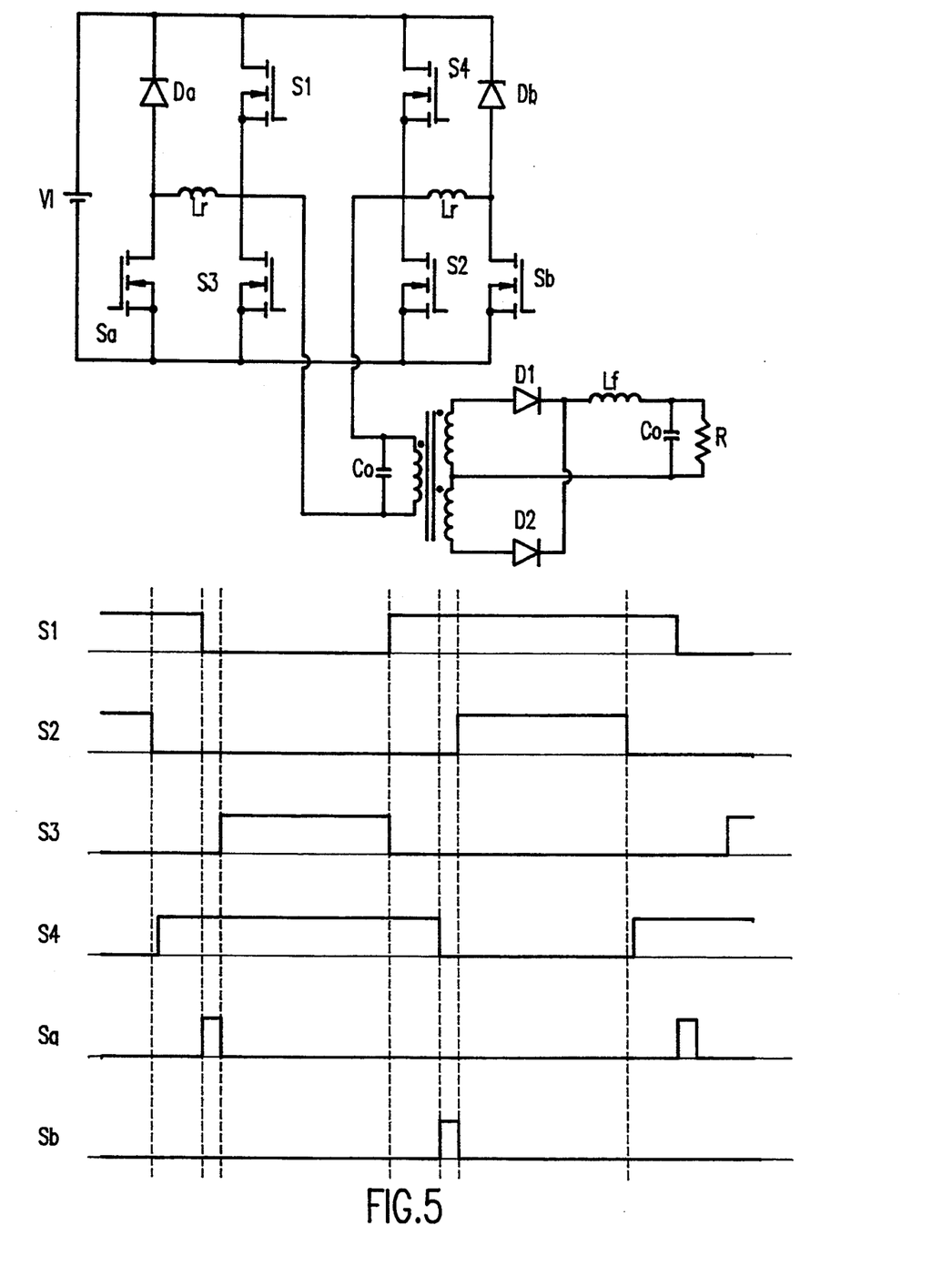
FIG. 5 is a circuit diagram on its waveforms of a full-bridge ZVT-PWM converter in accordance with the invention.

FIG. 5 shows the full-bridge (FB) ZVT-PWM converter and its switch gate-drive signals. In this diagram, $S_a$ and $S_b$ are two auxiliary switches, and $D_a$ and $D_b$ are two auxiliary diodes. The operations of two half-bridges are completely symmetrical. When two diagonal main switches are conducting, the lower switch of the bridge ($S_2$ or $S_3$) is always turned off first, so that the zero-voltage switching of the corresponding upper switch in the same leg is accomplished by discharging the resonant capacitor by the reflected output filter inductor current. The zero-voltage switching of the lower-arm switch of the totem pole, however, is achieved by transferring the energy stored in the resonant capacitor through the auxiliary resonant network to the input source prior to its turn-on. To reduce secondary parasitic ringing, it is desirable to minimize the transformer leakage inductance. If the transformer leakage is sufficiently low, the junction capacitance of the rectifier diodes can be reflected to the primary and becomes part of the resonant capacitor. Compared to the FB-ZVS-PWM converter, the new converter has several advantages: (a) much less circulating energy since no resonant inductor is used in the main power path, (b) no severe secondary parasitic ringing, (c) soft-switching of the rectifier diode, and (d) soft-switching operation maintained for the entire line range and load range. These features make the new topology attractive for high-power applications, especially when IGBTs or BJTs are used as the main switches.

Figure 6:
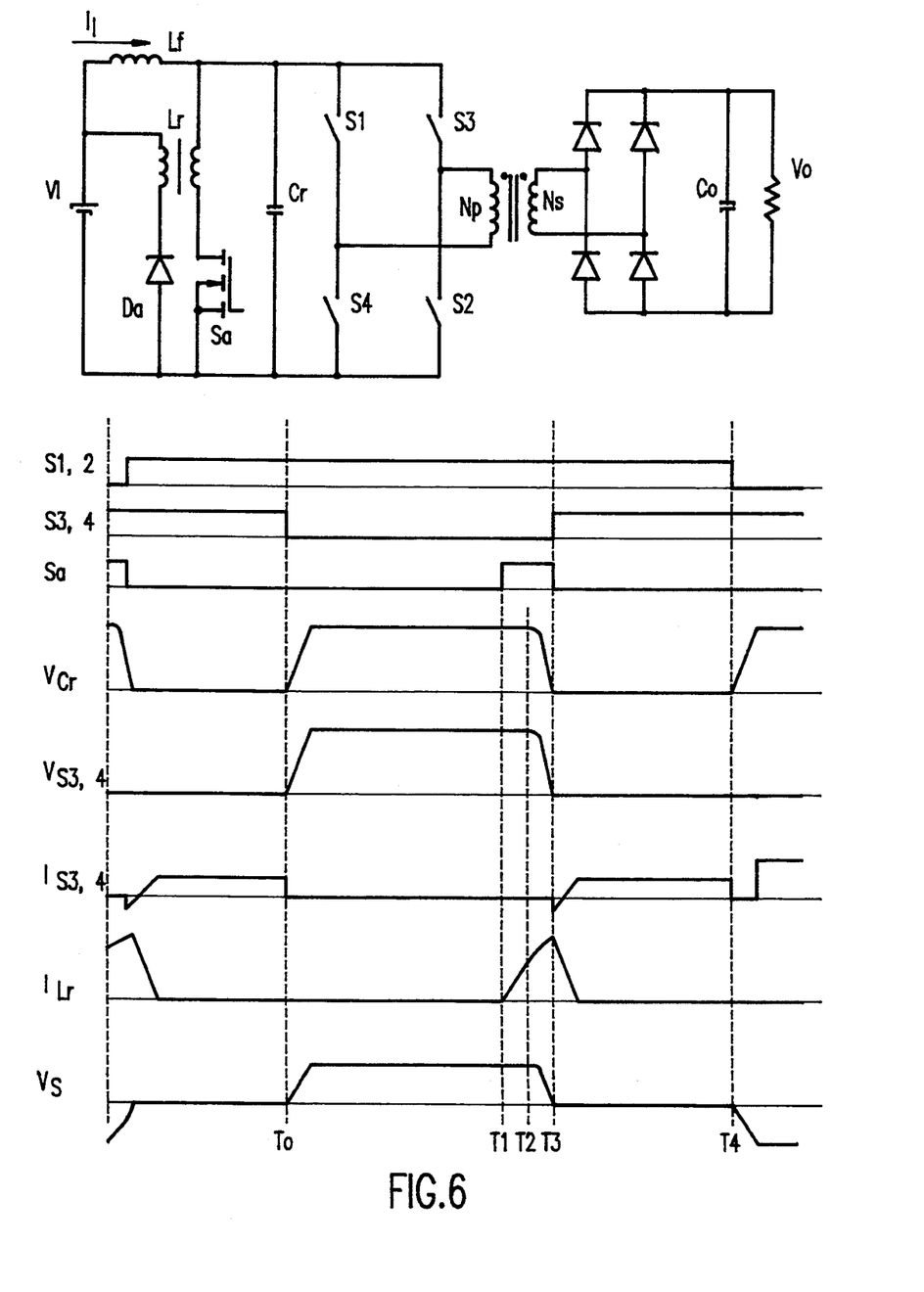
FIG. 6 is a current-fed FB-ZVT-PWM converter and its waveforms in accordance with the invention.

Another interesting topology is the current-fed FB-ZVT-PWM converter, which can also be called "FB-ZVT-PWM boost converter". The circuit diagram and its waveforms are shown in FIG. 6. The principle of operation of this converter is very similar to that of the ZVT-PWM boost converter. Due to the use of the auxiliary network, all the power switches and the rectifier diodes are zero-voltage switched. Since this is a current-fed converter, it is suited for PFC applications. Similarly, this concept can also be extended to the two-switch isolated boost converter.

The proposed ZVT technique can be applied to any dc-dc, dc-ac, ac-dc, or ac-ac power conversion topology.

EXPERIMENTAL VERIFICATIONS

Figure 7:
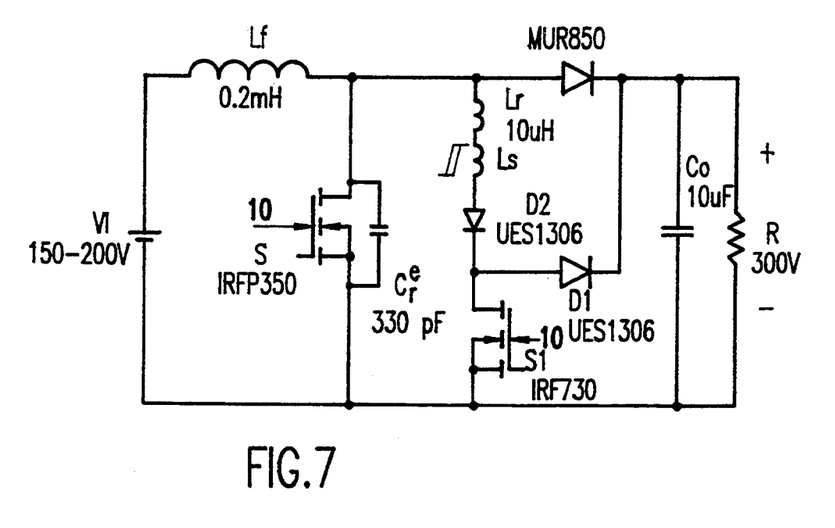
FIG. 7 is a circuit diagram of a 300 kHz, 600 W boost ZVT-PWM converter in accordance with the invention.

A 300 kHz, 600 W ZVT-PWM boost dc-dc converter has been implemented to demonstrate the operation. It is regulated at 300 V output with a 150–200 V input. The power stage circuit diagram is given in FIG. 7, where $L_S$ is a saturable reactor used to eliminate the ringing between Lr and S1 output capacitance. It is implemented with 5 turns on a Toshiba "Spike Killer" core, SA10×6×4.5. The fast-recovery diode D2 is used to prevent the conduction of S1 body diode. It can also be placed in series with S1. It should be noted that the current rating of the auxiliary switch (TRF730, 400 V, 5.5 A) is much lower than that of the main switch (IRFP 350, 400 V, 16 A).

Figure 8:
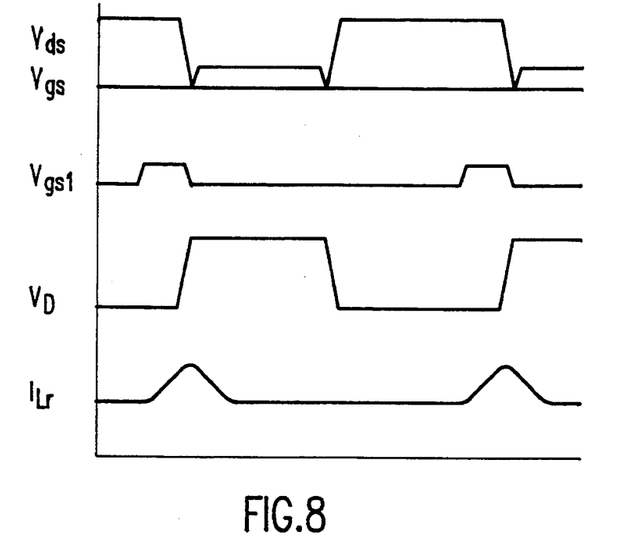
FIG. 8 shows oscillograms of the 300 kHz, 600 W boost ZVT-PWM converter of FIG. 7 at full load and 175 V input.

FIG. 8 shows the oscillograms of the breadboarded circuit operating at full load and 165 V input. It can be seen that all the waveforms are quite clean and agree well with the theoretical analysis. Both the MOSFET and the rectifier diode operate with zero-voltage-switching for the full line range and load range. The breadboarded converter achieved a remarkable maximum overall efficiency of 97% at full load and high line. Compared to the PWM version operating at the same input and output conditions, the circuit efficiency is improved by 2-3%. Moreover, the ZVT-PWM converter is much less noisy.

Figure 9:
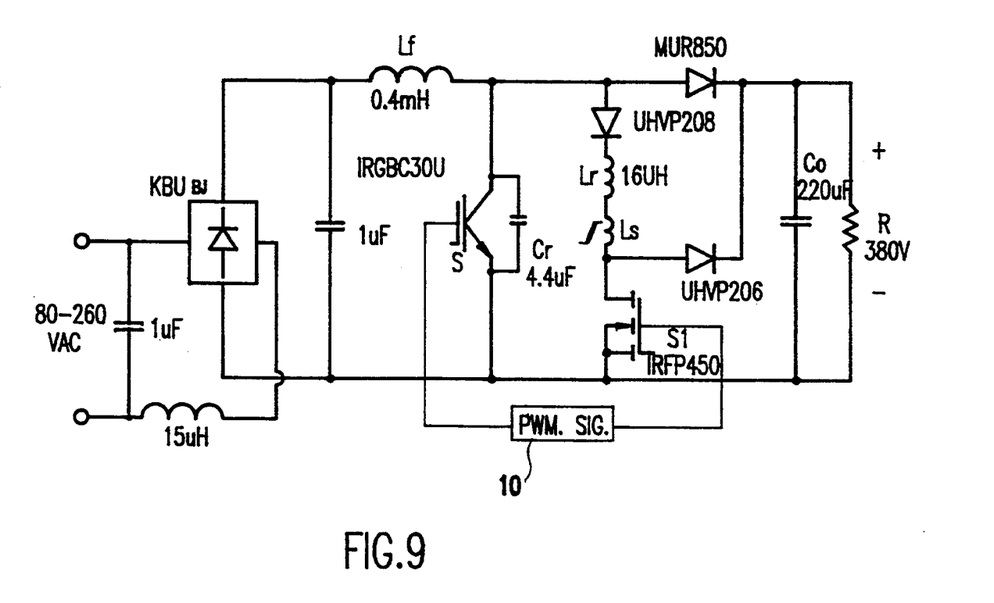
FIG. 9 is a circuit diagram of a 100 kHz, 600 W power factor correction circuit using a ZVT-PWM converter in accordance with the invention with IGBT switches FIG. 10 compares the efficiency of the IGBT PFC circuits using ZVT-PWM boost converters as in FIG. 9 and a conventional PWM boost converter.

FIG. 9 shows the circuit diagram of a 100 kHz, 600 W PFC circuit using the ZVT-PWM boost topology. To minimize the cost of the circuit, an IR TO-220 package IGBT, IRGBC30U, is used as the power switch. To reduce the IGBT turn-off loss and further reduce EMI noise, a 4.4 nF external resonant capacitor ($C_r{}^r$) is used to soften the switching actions. The breadboarded circuit is regulated at 380 V output with a 90-260 VAC universal input range.

Figure 10:
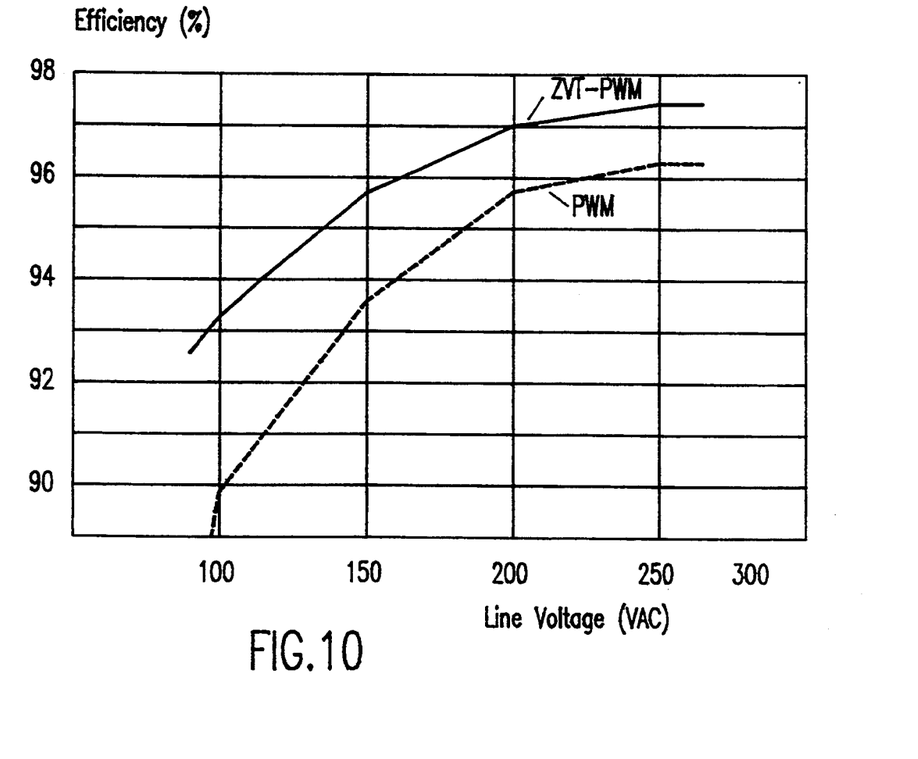

To compare the performance of the ZVT PFC circuit with that of the PWM circuit, the auxiliary resonant branch is removed. To achieve good thermal stability, the 20 W heatsink used for the IGBT device in the ZVT circuit is replaced by a 40 W one. FIG. 10 shows the efficiency measurement of two PFC circuits. It can be seen that the ZVT technique significantly improves the circuit efficiency. Moreover, owing to soft-switching operation, the ZVT circuit also significantly reduces circuit EMI noise and improves circuit reliability.

It should be noted that the efficiency of the PFC circuit is strongly dependent on the line range. When the ZVT PFC circuit shown in FIG. 9 is operated at 100 kHz, 1 kW with a 180-260 VAC input range (European line range), it can achieve a 97-98% overall efficiency.

CONCLUSIONS

Up to date, soft-switching techniques applied to the PWM converters, with the exception of a few isolated cases, are subjected to either high voltage stresses or high current stresses, or both. This invention presents a novel ZVT-PWM converter technology. It combines the advantages of the conventional PWM and the soft-switching resonant techniques. The advantages of the proposed ZVT-PWM converters are summarized as follows:
- both the active and passive switches operate with zero-voltage-switching;
- both switches are subjected to minimum voltage and current stresses are the same as those in their PWM counterparts;
- soft-switching operation can be easily maintained for wide line range and load range; and
- the switching frequency is constant.

The price paid is the addition of a small auxiliary switch, a small inductor, and a small diode. The auxiliary switch only handles a small fraction of the total power.

The operation of the proposed converters was analyzed by using the boost ZVT-PWM converter as an example. A 300 kHz, 600 W ZVT-PWM boost dc-dc converter, and a 100 kHz, 600 W PFC circuit using the ZVT-PWM technique and IGBT device were breadboarded to show the operation of the proposed converters. It is shown that the new circuit technology dramatically improves the converter performance in terms of efficiency, switching noise, and circuit reliability.

While the invention has been described in terms of a single preferred embodiment, those skilled in the art will recognize that the invention can be practiced with modification within the spirit and scope of the appended claims.

We claim:

1. A pulse-width-modulated d.c. to d.c. converter comprising in combination:
   a d.c. voltage input means;
   a d.c. voltage output means including an output filter and a rectifier diode;
   a pulse-width-modulating switch connected between said d.c. voltage input means and said d.c. voltage output means;
   a resonant circuit comprised of a capacitance, an inductance, and an auxiliary switch;
   means connecting said resonant circuit in parallel with pulse-width-modulating switch;
   a pulse-width-modulating signal source with means connecting said signal source to said pulse-width-modulating switch, and means connecting said signal source to said auxiliary switch;
   said pulse-width-modulating signal source switching said pulse-width-modulating switch between an on state and an off state at a fixed frequency and a varying duty cycle;
   said auxiliary switch being switched to an on state prior to said pulse-width-modulating switch being switched to an on state so that said auxiliary switch is in said on state a sufficient interval that said resonant circuit establishes a substantially zero voltage across said pulse-width-modulating switch when said pulse-width-modulating switch switches to an on state and said auxiliary switch being switched back to an off state for an interval after said pulse-width-modulating switch switches to an on state in order to control the resonance of said resonant circuit, whereby the pulse-width-modulating switch operates at a constant frequency with zero voltage switching of said pulse width-modulating switch and said rectifier diode over wide load range.

2. A pulse-width-modulated d.c. to d.c. converter comprising in combination:
   a d.c. voltage input means;
   a d.c. voltage output means including an output filter and a rectifier diode;
   a pulse-width-modulating switch connected between said d.c. voltage input means and said d.c. voltage output means;
   a resonant circuit comprised of a capacitance, an inductance, and an auxiliary switch;
   means connecting said resonant circuit in parallel with pulse-width-modulating switch and means connecting a node of said resonant circuit to a terminal of said rectifier diode;
   a pulse-width-modulating signal source with means connecting said signal source to said pulse-width-modulating switch, and means connecting said signal source to said auxiliary switch;
   said pulse-width-modulating signal source switching said pulse-width-modulating switch between an on state and an off state at a fixed frequency and a varying duty cycle;

said auxiliary switch being switched to an on state prior to said pulse-width-modulating switch being switched to an on state so that said auxiliary switch is in said on state a sufficient interval that said resonant circuit establishes a substantially zero voltage across said pulse-width-modulating switch when said pulse-width-modulating switch switches to an on state and said auxiliary switch being switched back to an off state for an interval after said pulse-width-modulating switch switches to an on state in order to control the resonance of said resonant circuit, whereby the pulse-width-modulating switch operates at a constant frequency with zero voltage switching of said pulse-width-modulating switch and said rectifier diode over wide load range.

* * * * *